(12) United States Patent
Yi et al.

(10) Patent No.: US 9,992,535 B2
(45) Date of Patent: Jun. 5, 2018

(54) FAST PROCESSING AND ENCRYPTION METHOD AND SYSTEM FOR COMPRESSED VIDEO

(71) Applicants: HANDONG GLOBAL UNIVERSITY INDUSTRY—ACADEMIC COOPERATION FOUNDATION, Pohang-si, Gyeongsangbuk-do (KR); CENTER FOR INTEGRATED SMART SENSORS, Daejeon (KR)

(72) Inventors: Kang Yi, Pohang-si (KR); Jeong Hyun Joo, Daejeon (KR); Chul Hui Lee, Daejeon (KR)

(73) Assignee: HANDONG GLOBAL UNIVERSITY INDUSTRY—ACADEMIC COOPERATION FOUNDATION, Daejeon (KR)

( * ) Notice: Subject to any disclaimer, the term of this patent is extended or adjusted under 35 U.S.C. 154(b) by 206 days.

(21) Appl. No.: 14/950,873

(22) Filed: Nov. 24, 2015

(65) Prior Publication Data

US 2016/0156970 A1 Jun. 2, 2016

(30) Foreign Application Priority Data

Nov. 27, 2014 (KR) ........................ 10-2014-0167630

(51) Int. Cl.
*H04N 7/167* (2011.01)
*H04N 21/4408* (2011.01)
*H04N 19/176* (2014.01)
*H04N 19/513* (2014.01)
*H04N 21/2347* (2011.01)
*H04N 21/835* (2011.01)
*H04N 19/159* (2014.01)
*H04N 19/48* (2014.01)
*H04K 1/00* (2006.01)

(52) U.S. Cl.
CPC ....... *H04N 21/4408* (2013.01); *H04N 19/159* (2014.11); *H04N 19/176* (2014.11); *H04N 19/48* (2014.11); *H04N 19/513* (2014.11); *H04N 21/2347* (2013.01); *H04N 21/835* (2013.01)

(58) Field of Classification Search
CPC ........... H04N 21/4408; H04N 21/4627; H04N 21/2541; H04N 21/2347; H04N 19/176; H04N 19/513; H04N 19/625; H04N 19/103; H04N 19/44
USPC ........................................................ 380/217
See application file for complete search history.

(56) References Cited

U.S. PATENT DOCUMENTS

2005/0028192 A1* 2/2005 Hooper .................. H04N 5/913
725/31
2015/0381980 A1* 12/2015 Tsuchiya .............. H04N 19/176
375/240.02

\* cited by examiner

*Primary Examiner* — Evans Desrosiers
(74) *Attorney, Agent, or Firm* — Fenwick & West LLP

(57) ABSTRACT

An encryption method for compressed video is provided. The encryption method includes the steps of confirming a partial bit stream included in a compressed video, and selectively using a lookup table—the lookup table storing encryption information, which is needed for each encryption of a plurality of bit streams, at addresses of patterns respective to the plurality of bit streams—based on a result of the confirmation and encrypting the partial bit stream.

9 Claims, 11 Drawing Sheets

FAST PROCESSING AND ENCRYPTION METHOD AND SYSTEM FOR COMPRESSED VIDEO

CROSS-REFERENCE TO RELATED APPLICATION(S)

This application claims priority under 35 U.S.C. § 119(a) to Republic of Patent Application No. 10-2014-0167630 filed on Nov. 27, 2014, which is incorporated by reference herein in its entirety.

BACKGROUND

Field of Art

The present disclosure relates to an encryption system and method for compressed video and more particularly, to a fast encryption system and method a part of bit streams included in a compressed video.

Description of the Related Art

The technology for encrypting videos may be generally classified into the types of Advanced Encryption Standard (AES) and Riverst Shamir Adelman (RSA) which encrypt the whole body of video.

In the encryption standards for encrypting the whole body of video, it is much dissipative in encrypted video amount and further takes too much time and cost to fully encrypt such massive video because of so massive amount of encryption.

Hereupon, this specification proposes the technology of reducing a time and cost for encryption by encrypting fast a part of bit streams included in a compressed video.

Additionally, this specification proposes the technology of reducing an amount of video, and a time and cost for encryption by selectively encrypting an input frame based on prediction modes respective to a plurality of macroblocks of the input frame, which includes a part of bit streams in encryption, after decrypting a part of bit streams through a standard decryption mechanism.

SUMMARY

Embodiments of of the present disclosure are to provide an encryption method and system for reducing a time and cost for encryption by encrypting fast a part of bit streams, which is included in a compressed video, without decryption.

Additionally, embodiments of the present disclosure are to provide an encryption method and system for reducing an amount of video, and a time and cost for encryption by selectively encrypting an input frame based on prediction modes respective to a plurality of macroblocks of the input frame which is included in a video to be compresses or a compressed video partly decompressed.

During this, embodiments of the present disclosure are to provide an encryption method and system for conditioning an encrypted video to be hardly recognized in vision and to be difficulty inverse-estimated by a hacker.

Additionally, embodiments of the present disclosure are to provide an encryption method and system for shortening a delay time of decryption and for maintaining a standard compression format.

An encryption method for compressed video according to an embodiment of the present disclosure may include the steps of confirming a partial bit stream included in a compressed video; and selectively using a lookup table—the lookup table storing encryption information, which is needed for each encryption of a plurality of bit streams, at addresses of patterns respective to the plurality of bit streams—based on a result of the confirmation and encrypting the partial bit stream.

The step of encrypting the partial bit stream may include the steps of, if a pattern of the partial bit stream matches with one of patterns respective to the plurality of bit streams stored in the lookup table, extracting encryption information at an address of the one pattern; and encrypting the partial bit stream based on the extracted encryption information.

The encryption information may include information about prediction modes of macroblocks respective to the plurality of bit streams, information relevant to bits that are included respectively in the plurality of bit streams and are to be encrypted, and information for code lengths respective to the plurality of bit streams, wherein the encrypting of the partial bit stream may include the steps of obtaining an input frame including the extracted encryption information; selecting at least one of encryption options including macroblock order change, DCT coefficient sign change, and motion vector difference code change, based on predictions modes respective to a plurality of macroblocks included in the input frame that is confirmed from the extracted encryption information; and encrypting the input frame in accordance with the selected encryption option.

The step of encrypting the partial bit stream may include the steps of, unless a pattern of the partial bit stream matches with one of patterns respective to the plurality of bit streams stored in the lookup table, decrypting the partial bit stream based on a standard decryption mode; and encrypting the partial bit stream based on a result of the decryption.

The step of encrypting the partial bit stream may include the steps of obtaining an input frame including the partial bit stream; selecting at least one of encryption options including macroblock order change, DCT coefficient sign change, and motion vector difference code change, based on predictions modes respective to a plurality of macroblocks included in the input frame that is confirmed from the extracted encryption information; and encrypting the input frame in accordance with the selected encryption option.

The encryption method for compressed video may further include the step of preliminarily building based on frequencies, which appear in a plurality of compressed videos including the compressed video, of patterns respective to the plurality of bit streams.

The step of confirming the partial bit stream included in the compressed video may include the step of confirming whether a pattern of the partial bit stream matches with one of patterns respective to the plurality of bit streams stored in the lookup table.

An encryption method for compressed video according to another embodiment of the present disclosure may include the steps of obtaining an input frame from a compressed video that is to be compressed or from a compressed video that is partly decompressed; and selectively encrypting the input frame based on prediction modes respective to a plurality of macroblocks included in the input frame.

The step of selectively encrypting the input frame may include the steps of determining to encrypt the input frame based on prediction modes respective to the plurality of macroblocks; if the determination results in that the input frame is to be encrypted, selecting at least one of encryption options including macroblock order change, DCT coefficient sign change, and motion vector difference code change, based on predictions modes respective to a plurality of macroblocks; and encrypting the input frame in accordance with the selected encryption option.

The step of obtaining the input frame may include the step of sequentially extracting the input frame from a plurality of frames included in the video that is to be compressed or the compressed video that is partly decompressed.

The step of obtaining the input frame may include the step of grouping a plurality of frames, which is included in the video that is to be compressed or the compressed video that is partly decompressed, into two or more frames and sequentially extracting the input frame.

An encryption system for compressed video according to an embodiment of the present disclosure may include a confirming part to confirm a partial bit stream included in a compressed video; and a processing part to selectively use a lookup table—the lookup table storing encryption information, which is needed for each encryption of a plurality of bit streams, at addresses of patterns respective to the plurality of bit streams—based on a result of the confirmation and to process the partial bit stream.

If a pattern of the partial bit stream matches with one of patterns respective to the plurality of bit streams stored in the lookup table, the processing part may extract encryption information at an address of the one pattern and may encrypt the partial bit stream based on the extracted encryption information.

Unless a pattern of the partial bit stream matches with one of patterns respective to the plurality of bit streams stored in the lookup table, the processing part may decrypt the partial bit stream based on a standard decryption mode and may encrypt the partial bit stream based on a result of the decryption.

An encryption system for compressed video according to an embodiment of the present disclosure may include a confirming part to confirm a partial bit stream included in a compressed video; and a processing part to selectively use a lookup table—the lookup table storing encryption information, which is needed for each encryption of a plurality of bit streams, at addresses of patterns respective to the plurality of bit streams—based on a result of the confirmation and to process the partial bit stream.

The processing part may determine to encrypt the input frame based on prediction modes respective to the plurality of macroblocks; if the determination results in that the input frame is to be encrypted, may select at least one of encryption options including macroblock order change, DCT coefficient sign change, and motion vector difference code change, based on predictions modes respective to a plurality of macroblocks; and may encrypt the input frame in accordance with the selected encryption option.

Embodiments of the present disclosure may provide an encryption method and system for reducing a time and cost for encryption by encrypting fast a part of bit streams, which is included in a compressed video, without decryption.

Additionally, embodiments of the present disclosure may provide an encryption method and system for reducing an amount of video, and a time and cost for encryption by selectively encrypting an input frame based on prediction modes respective to a plurality of macroblocks of the input frame which is included in a video to be compresses or a compressed video partly decompressed.

During this, embodiments of the present disclosure may provide an encryption method and system for conditioning an encrypted video to be hardly recognized in vision and to be difficulty inverse-estimated by a hacker.

Additionally, embodiments of the present disclosure may provide an encryption method and system for shortening a delay time of decryption and for maintaining a standard compression format.

DETAILED DESCRIPTION OF EMBODIMENTS

Figure 1:
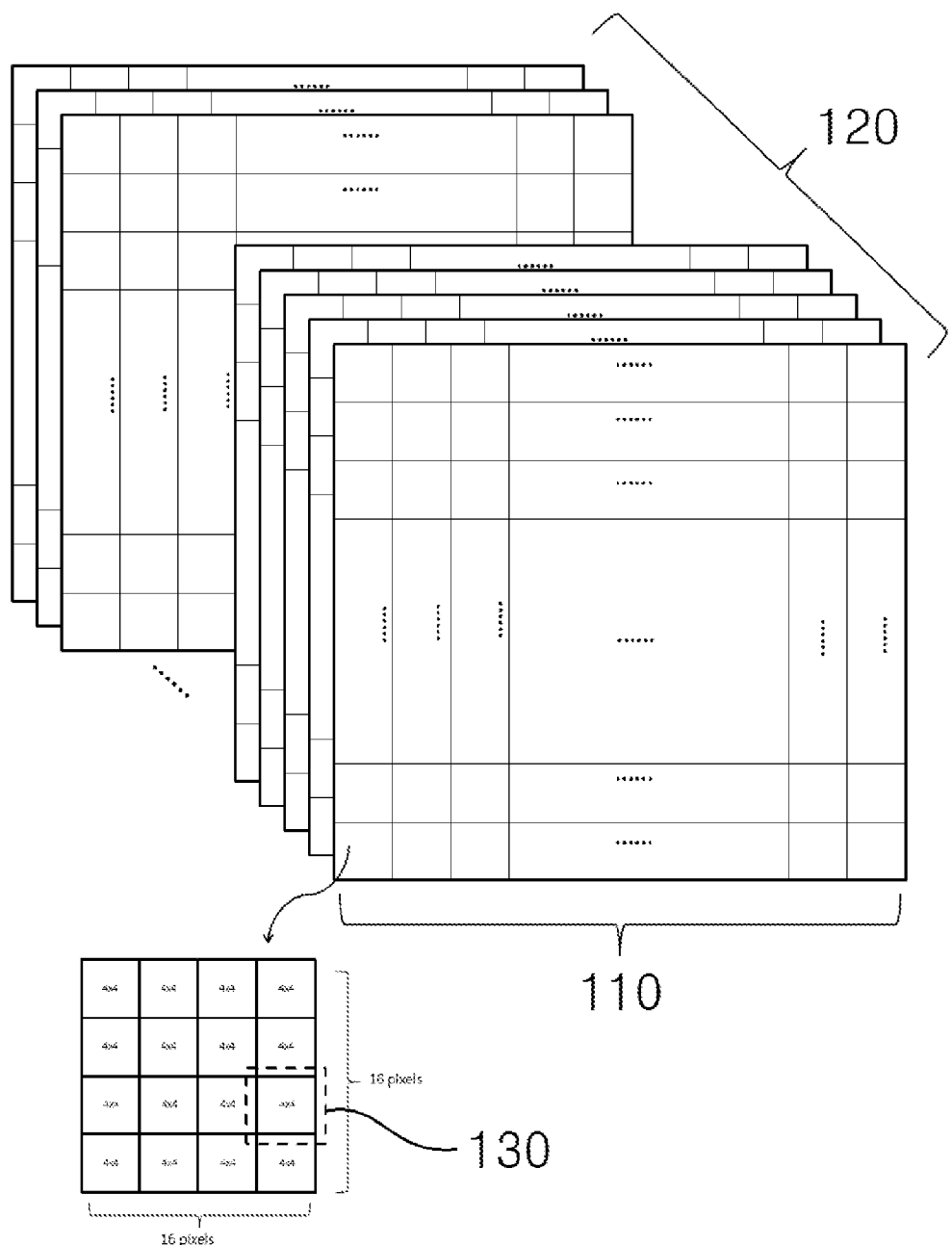
FIG. 1 is a diagram illustrating a plurality of macroblocks included in an input frame extracted from a compressed image according to an embodiment of the present disclosure.

Hereinafter, embodiments of the present disclosure will be described in conjunction with the accompanying drawings. However, the present disclosure may not be intentionally confined in embodiments. Additionally, like reference numerals shown in the accompanying drawings refer to like elements.

FIG. 1 is a diagram illustrating a plurality of macroblocks included in an input frame extracted from a compressed image according to an embodiment of the present disclosure.

Referring to FIG. 1, a compressed video according to an embodiment of the present disclosure may be composed of a plurality of frames 120 each including a plurality of macroblocks 110. Each macroblock 110 indicates a square field composed of 16×16 pixels.

As each of the macroblocks 110 is converted through a video compression process into a frequency domain, which has a frequency component, from a pixel domain which has a pixel component, each macroblock may include 16 4×4 Discrete Cosine Transform (DCT) blocks 130 having DCT coefficients. Hereinafter, the 4×4 DCT block 130 may indicate a block of frequency domain and the DCT coefficient may indicate a frequency component corresponding to the 4×4 DCT block 130.

A video compressing process may be performed by predicting a current frame value based on a previous frame value for each frame of a video. In detail, a video compressing process may be performed to convert a 16×16 pixel of a domain into the 4×4 DCT block 130, which has a DCT coefficient, by divisionally storing a residual value, which is a difference a practical value of a current frame and a prediction value of the current frame given from a prediction mode in a pixel domain, with the unit of 4×4 block in a frequency domain and by converting the stored value to represent the DCT coefficient.

During this, the video encryption process may perform coding by including a quantization process to reduce the number of non-0 values of the DCT-converted DCT coefficient, and by including an entropy encrypting process to scan and align DCT coefficients in a line and to change codes thereof. This coding process means a variable length coding to make the least length. Additionally, after video compression, a bit stream representing with first-dimensional binary values may be generated (not shown).

In a video compression process, intra-prediction or inter-prediction may be used as a prediction mode in correspondence with a kind of macroblock. The intra-prediction operates to predict pixel values of a current macroblock from pixel values of adjacent macro block (e.g., a macroblock just over or at the left of the current macroblock) in the same frame. Otherwise, the inter-prediction operates to pixel values of a current macroblock by searching a macroblock having most similar values to those of the current macroblock in a reference frame and by calculating and using a motion vector difference as a difference value from a motion vector, which is a positional difference between the searched macroblock and the current macroblock, to a motion vector between adjacent macroblocks. Detailed descriptions about the intra prediction and the inter-prediction will be omitted because those are out of the technical concept of the present disclosure.

As such, since a prediction mode used for a video compression process affects the video characteristics to a frame of a compressed video, an encryption system for compressed video according to an embodiment of the present disclosure may selectively encrypt an input frame by partly decompressing the compressed video (e.g., partly decrypting) and thereafter by selectively encrypting the input frame based on prediction modes respective to the plurality of macroblocks 110 included in the compressed video which is partly decompressed video.

For example, in the case that the plurality of macroblocks 110 of an input frame is totally coded through an intra-prediction mode, a frame corresponding thereto is a frame I. In the case that the macroblocks 110 of an input frame is coded through a composite mode of the intra-prediction and inter-prediction, a frame corresponding thereto is a frame P. Accordingly, an encryption system for compressed video may be aware of the video characteristics of a frame in accordance with ratios of prediction modes respective to the plurality of macroblocks 110 in an input frame included in a compressed video which is partly decompressed, and may selectively encrypt the input frame in accordance with the video characteristics of the input frame (e.g., an encryption system for compressed video may not encrypt normally the frame P but may adaptively encrypt by skipping one frame). During this, because the frame I does not have an error which is caused from the inter-prediction, the frame I may be conditioned in a good video quality to act as a reference frame when compressing the frame P.

Accordingly, an encryption system for compressed video may analyze video characteristics of an input frame based on respective prediction modes, and may use the analyzed video characteristics to determine to encrypt the input frame. Depending on a result of the determination, the encryption system may selectively encrypt the input frame.

Additionally, in the case of determining to encrypt an input frame, an encryption system for compressed video according to an embodiment of the present disclosure may select at least one of encryption options, which include macroblock order change, DCT coefficient sign change, and motion vector difference code change, to efficiently encrypt an input frame in accordance with the selected encrypting option. For example, an encryption system for compressed video may select at least one of encryption options, which include macroblock order change, DCT coefficient sign change, and motion vector difference code change, according to occupation ratios of intra-prediction, inter-prediction, and skip prediction in prediction modes respective to the plurality of macroblocks 110. For more detailed example, in the case that infra-prediction is more frequent than inter-prediction and skip prediction in prediction modes respective to the plurality of macroblocks 110, an encryption system for compressed video may select macroblock order change from encryption options including the macroblock order change, DCT coefficient sign change, and motion vector difference code change, and may encrypt an input frame in accordance with the option of the selected macroblock.

During this, an encryption system for compressed video may perform an encryption process to maintain compatibility with a standard using a preliminarily established encryption keys. A detailed explanation about this will be described in conjunction with FIGS. 2, 3, and 4.

Hereat, an encryption system for compressed video may even perform an encryption process during a compression process, as well as performing the aforementioned encryption process, after partly decompressing a compressed video. In this case, an encryption system for compressed image may obtain an input frame from a video which is to be compressed, instead of parsing and partly decompressing an input frame from a bit stream of a compressed video. For example, to perform an encryption process, an encryption system for compressed video may set prediction modes respective to the plurality of macroblocks included in an input frame of a video which is to be compressed, and thereafter may selectively encrypt the input frame based on the set prediction modes respective to the plurality of macroblocks. During this, an encryption mode is same with the aforementioned. Hereinafter, encryption for compressed video will mean encryption for a video which is to be compressed, or will mean encryption for a compressed video which is partly decompressed.

Figure 2:
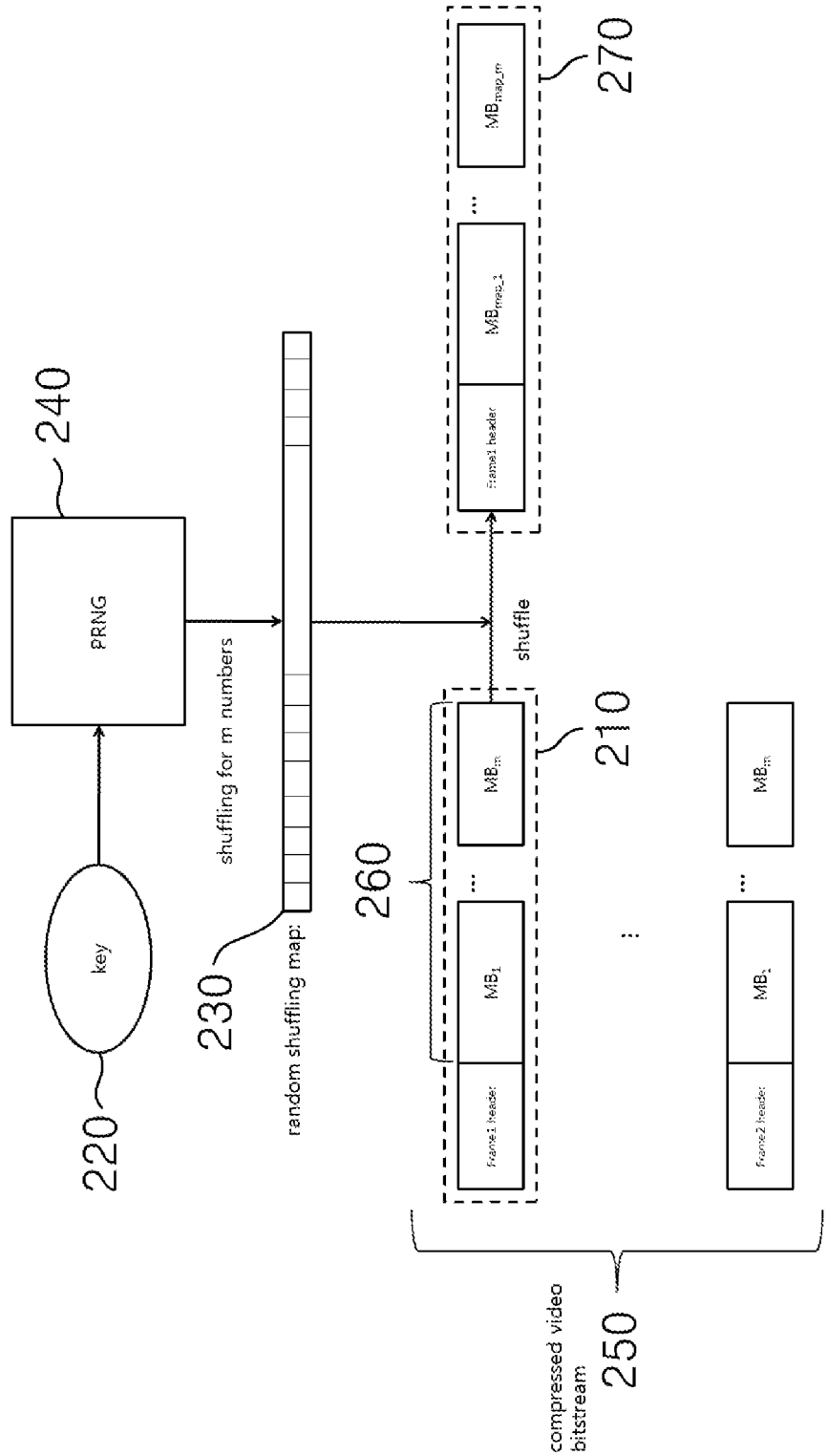
FIG. 2 is a schematic diagram illustrating an encryption process for compressed video according to an embodiment of the present disclosure.

FIG. 2 is a schematic diagram illustrating an encryption process for compressed video according to an embodiment of the present disclosure.

Referring to FIG. 2, an encryption system for compressed video according to an embodiment of the present disclosure may encrypt an input frame 210 in accordance with an encryption option of macroblock order change. During this, an encryption system for compressed system may encrypt the input frame 210 in accordance with an encryption option of macroblock order change through a random shuffling map 230 which is generated from a preliminarily established encryption key 220. During this, the random shuffling map 230 may shuffle and generate a random value which is generated through Pseudo Random Number Generator (PRNG) 240 with the preliminarily established encryption key 220 as a seed.

In detail, an encryption system for compressed video may determine to encrypt the input frame 210 based on prediction modes respective to the plurality of macroblocks included in the input frame 210 after parsing the input frame 210 from a bit stream 250 of a compressed video which is partly decompressed (if an encryption process described later is performed in a compression process, the encryption system for compressed video obtains the input frame 210 from a video, which is to be compressed, instead of parsing the input frame 210). After the determination, in the case of encrypting the input frame 210, the encryption system for compressed video may encrypt the input frame 210 by changing an order of the plurality of macroblocks 260, which is included in the input frame 210, through the random shuffling map 230.

This encryption process may be performed for each of a plurality of frames by sequentially extracting the input frame 210 from the plurality of frames included in the bit stream 250 of a compressed video (if the encryption process performs in a compression process, the encryption system for compressed video may extract the input frame 210 in sequence from a plurality of frames obtained from a video, which is to be compressed, instead of extracting the input frame 210 in sequence from a plurality of frames included in the bit stream 250). Hereat, the encryption process may be selectively performed in accordance with video characteristics of the input frame 210, such as prediction modes respective to the plurality of macroblocks 260 included in the input frame 210, or may not be performed.

Although not shown in additional drawings, an encryption process may be even performed with grouped frames by grouping a plurality of frames, which is included in the bit stream 250 of a compressed video, into two or more frames and by extracting the input frame in sequence from the grouped frames (if the encryption process is performed in a compression process, the encryption system for compressed video may group a plurality of frames, which is obtained from a video which is to be compressed, into two or more frames, into two or more frames, instead of grouping a plurality of frames, which is included in the bit stream 250 of a compressed video, into two or more frames). In this case, an encryption system for compressed video may use the random shuffling map 230 to encrypt an input frame by changing an order of the plurality of frames (all of the plurality of macroblocks included in two frames), which is included in the input frame formed of the two frames, in the input frame formed of the two frames.

Additionally, after performing the aforementioned encryption process, an encryption system for compressed video may further perform an entropy encrypting process for the input frame 270, which is encrypted, for compatibility with a standard.

Figure 3:
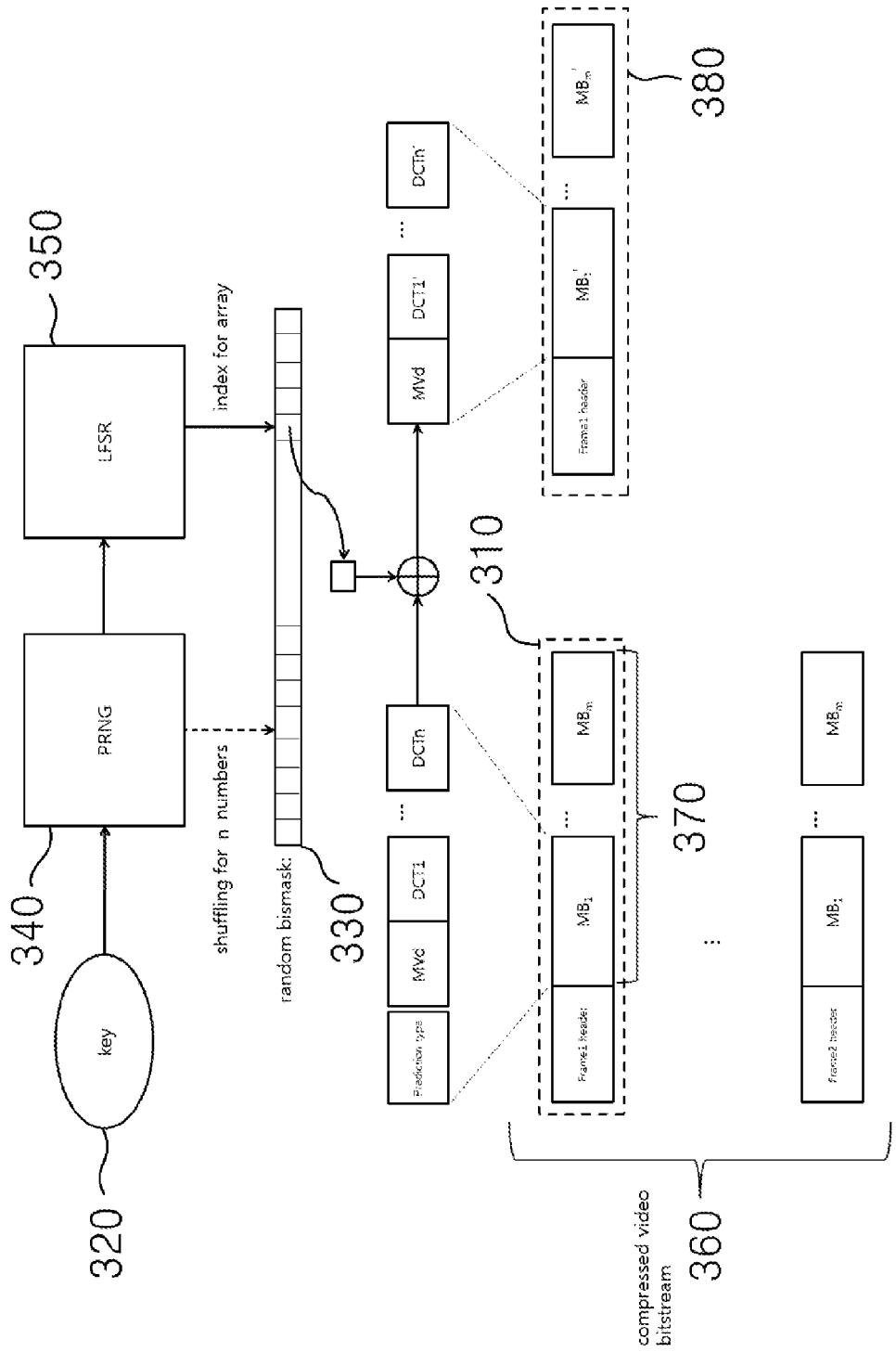
FIG. 3 is a schematic diagram illustrating an encryption process for compressed video according to another embodiment of the present disclosure.

FIG. 3 is a schematic diagram illustrating an encryption process for compressed video according to another embodiment of the present disclosure.

Referring to FIG. 3, an encryption system for compressed video according to another embodiment of the present disclosure may encrypt an input frame 310 in accordance with an encryption option of DCT coefficient sign change. During this, the encryption system for compressed video may encrypt the input frame 310 in accordance with the encryption option of DCT coefficient sign change by using a random bitmask 330 which is generated from a preliminarily established encryption key 320. Hereat, in the random bitmask 330, a random value generated through a PRNG 340 with a seed of the encryption key 320 preliminarily established may be shuffled and shifted through a Linear Feedback Shift Register (LFSR) 350.

In detail, an encryption system for compressed video may determine to encrypt the input frame 310 based on prediction modes respective to a plurality of macroblocks 370 included in the input frame 310 after parsing the input frame 310 from a bit stream 360 of a compressed video which is partly decompressed (if an encryption process is performed in a compression process, the encryption system for compressed video obtains the input frame 310 from a video, which is to be compressed, instead of parsing the input frame 310). After the determination, in the case of encrypting the input frame 310, the encryption system for compressed video may encrypt the input frame 310 by changing signs of DCT coefficients in application with a logical operation (e.g., exclusive-OR) between a component of the random bitmask 330 and the sign bits of the DCT coefficients included respectively in the plurality macroblocks 370. During this, the DCT coefficient sign change may be performed respectively for the plurality of macroblocks 370, or may be even performed for only a part of the plurality of macroblocks 370.

This encryption process may be performed for each of a plurality of frames by extracting the input frame 310 in sequence from the plurality of frames included in the bit stream 360 of a compressed video (if the encryption process is performed in a compression process, an encryption system for compressed video may extract the input frame 310 in sequence from a plurality of frames, which is obtained from a video which is to be compressed, instead of extracting the input frame 310 in sequence from a plurality of frames included in the bit stream 360 of a compressed video). During this, the encryption process may be selectively performed in accordance with video characteristics of the input frame 310, such as prediction modes respective to the plurality of macroblocks 370 included in the input frame 310, or may not be performed.

Although not shown in additional drawings, an encryption process may be even performed with grouped frames by grouping a plurality of frames, which is included in the bit stream 360 of a compressed video, into two or more frames and by extracting the input frame in sequence from the grouped frames (if the encryption process is performed in a compression process, the encryption system for compressed video may group a plurality of frames, which is obtained from a video which is to be compressed, into two or more frames, into two or more frames, instead of grouping a plurality of frames, which is included in the bit stream 360 of a compressed video, into two or more frames).

Additionally, after performing the aforementioned encryption process, an encryption system for compressed video may further perform an entropy encrypting process for the input frame 380, which is encrypted, for compatibility with a standard.

Figure 4:
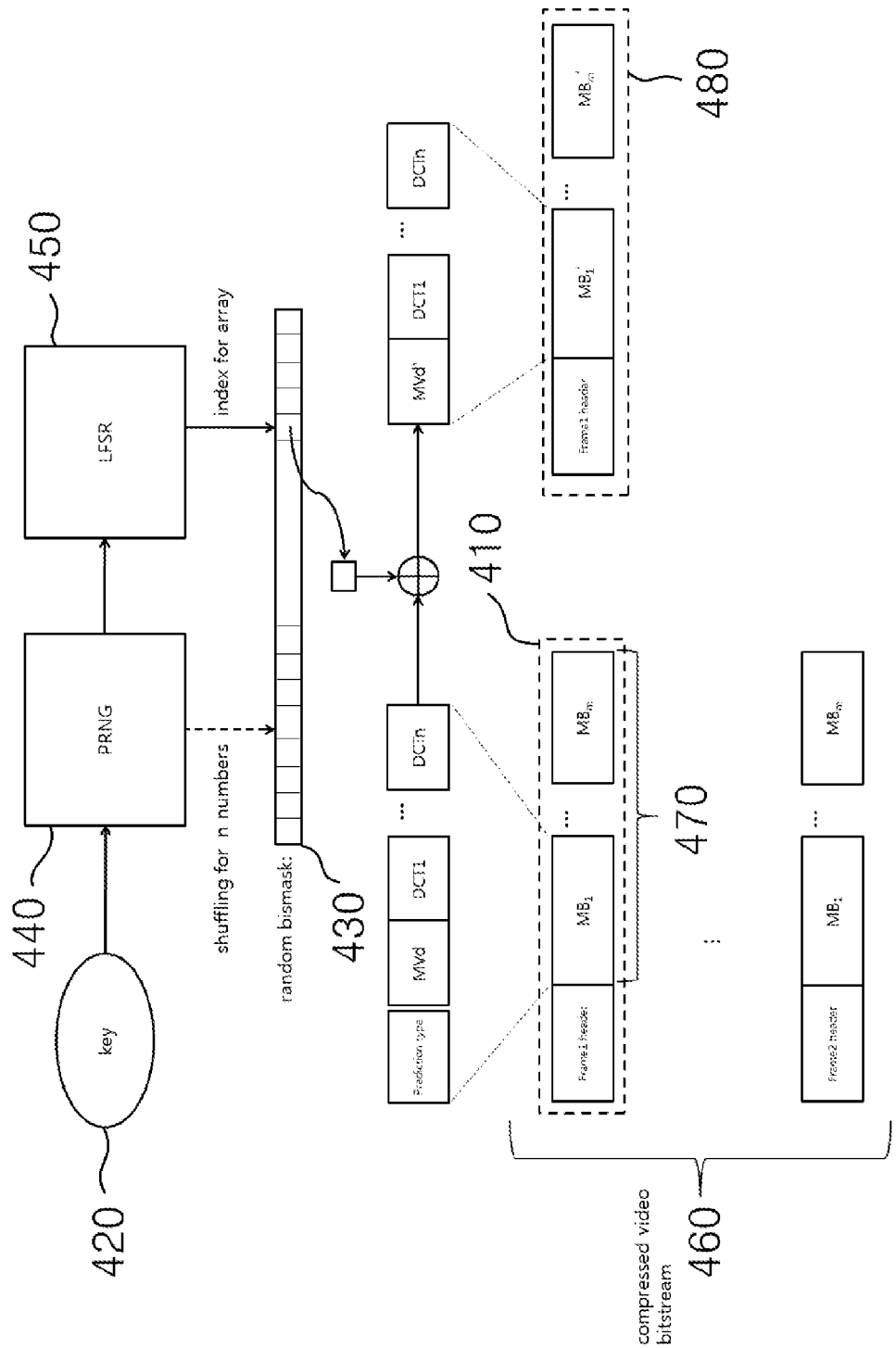
FIG. 4 is a schematic diagram illustrating an encryption process for compressed video according to still another embodiment of the present disclosure.

FIG. 4 is a schematic diagram illustrating an encryption process for compressed video according to still another embodiment of the present disclosure.

Referring to FIG. 4, an encryption system for compressed video according to still another embodiment of the present disclosure may encrypt an input frame 410 in accordance with an encryption option of motion vector difference code change. During this, the encryption system for compressed video may encrypt the input frame 410 in accordance with the encryption option of motion vector difference code change by using a random bitmask 430 which is generated from a preliminarily established encryption key 420. Hereat, in the random bitmask 430, a random value generated through a PRNG 440 with a seed of the encryption key 420 preliminarily established may be shuffled and shifted through an LFSR 450.

In detail, an encryption system for compressed video may determine to encrypt the input frame 410 based on prediction modes respective to a plurality of macroblocks 470 included in the input frame 410 after parsing the input frame 410 from a bit stream 460 of a compressed video which is partly decompressed (if an encryption process is performed in a compression process, the encryption system for compressed video obtains the input frame 410 from a video, which is to be compressed, instead of parsing the input frame 410). After the determination, in the case of encrypting the input frame 410, the encryption system for compressed video may encrypt the input frame 410 by changing at least a part of motion vector difference codes through the random bitmask 430. For example, an encryption system for compressed video may encrypt the input frame 410 by changing at least a part of motion vector difference codes in application with a logical operation (e.g., exclusive-OR) between a component of the random bitmask 430 and information codes included in the motion vector difference codes respective to the plurality macroblocks 470. During this, the motion vector difference code change may be performed respectively for the plurality of macroblocks 470, or may be even performed for only a part of the plurality of macroblocks 470.

This encryption process may be performed for each of a plurality of frames by extracting the input frame 410 in sequence from the plurality of frames included in the bit stream 460 of a compressed video (if the encryption process is performed in a compression process, an encryption system for compressed video may extract the input frame 410 in sequence from a plurality of frames, which is obtained from a video which is to be compressed, instead of extracting the input frame 410 in sequence from a plurality of frames included in the bit stream 460 of a compressed video). During this, the encryption process may be selectively performed in accordance with video characteristics of the input frame 410, such as prediction modes respective to the plurality of macroblocks 470 included in the input frame 410, or may not be performed.

Although not shown in additional drawings, an encryption process may be even performed with grouped frames by grouping a plurality of frames, which is included in the bit stream 460 of a compressed video, into two or more frames and by extracting the input frame in sequence from the grouped frames (if the encryption process is performed in a compression process, the encryption system for compressed video may group a plurality of frames, which is obtained from a video which is to be compressed, into two or more frames, into two or more frames, instead of grouping a plurality of frames, which is included in the bit stream 460 of a compressed video, into two or more frames).

Additionally, after performing the aforementioned encryption process, an encryption system for compressed video may further perform an entropy encrypting process for the input frame 480, which is encrypted, for compatibility with a standard.

Figure 5:
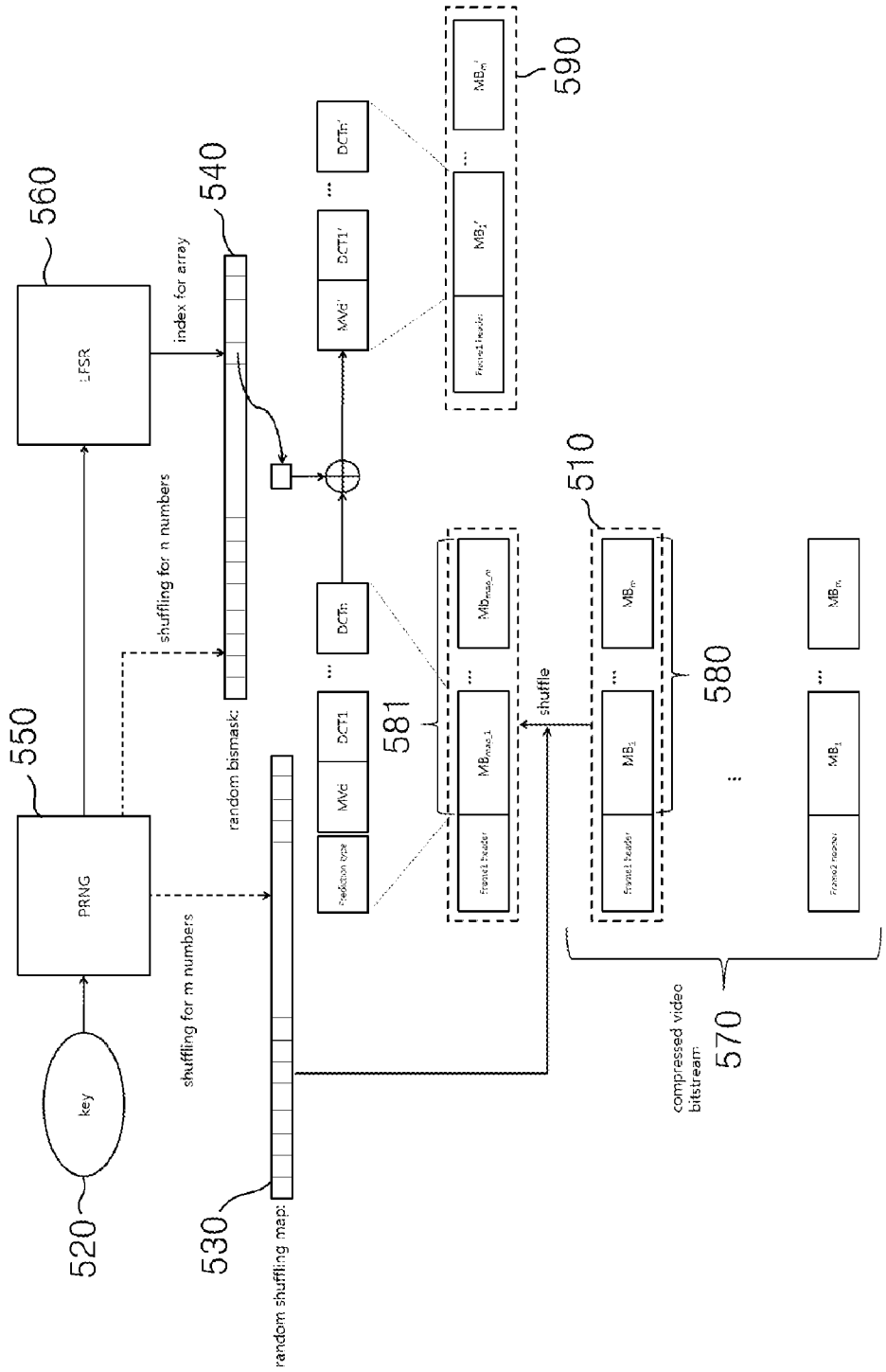
FIG. 5 is a schematic diagram illustrating an encryption process mixed with the encryption options shown in FIGS. 2, 3, and 4.

FIG. 5 is a schematic diagram illustrating an encryption process mixed with the encryption options shown in FIGS. 2, 3, and 4.

Referring to FIG. 5, an encryption system for compressed video may encrypt an input frame 510 in a mixture of macroblock order change, DCT coefficient sign change, and motion vector difference code change. During this, the encryption system for compressed video may encrypt the input frame 510 in accordance with an encryption option of macroblock order change by using a random shuffling map 530 and a random bitmask 540 which are generated from a preliminarily established encryption key 520. Hereat, in the random bitmask 530, a random value generated through a PRNG 550 with a seed of the encryption key 520 preliminarily established may be shuffled and shifted through an LFSR 560.

In detail, an encryption system for compressed video may determine to encrypt the input frame 510 based on prediction modes respective to a plurality of macroblocks 570 included in the input frame 510 after parsing the input frame 510 from a bit stream 570 of a compressed video which is partly decompressed (if an encryption process is performed in a compression process, the encryption system for compressed video obtains the input frame 510 from a video, which is to be compressed, instead of parsing the input frame 510). After the determination, in the case of encrypting the input frame 510, the encryption system for compressed video may encrypt the input frame 510 by, after changing an order of the plurality of macroblocks 580, which is included in the input frame 510, through the random shuffling map 530, changing sings of DCT coefficients in application with a logical operation (e.g., exclusive-OR) between a component of the random bitmask 540 and sign bits of the DCT coefficients included respectively in a plurality of macroblocks 581 which is changed in order and by changing at least a part of motion vector difference codes in application with a logical operation between a component of the random bitmask 530 and information codes included respectively in motion vector difference codes respective to the plurality of macroblocks 581 which is changed in order.

Hereat, although the encryption process is described with a mixture including all encryption options of macroblock order change, DCT coefficient sign change, and motion vector difference code change, embodiments of the present disclosure may not be restrictive hereto or may not be confined herein and otherwise may be even performed in a mixture by with at least two or more selections including macroblock order change, DCT coefficient sign change, and motion vector difference code change.

This encryption process may be performed for each of a plurality of frames by extracting the input frame 510 in sequence from the plurality of frames included in the bit stream 570 of a compressed video (if the encryption process is performed in a compression process, an encryption system for compressed video may extract the input frame 510 in sequence from a plurality of frames, which is obtained from a video which is to be compressed, instead of extracting the input frame 510 in sequence from a plurality of frames included in the bit stream 460 of a compressed video). During this, the encryption process may be selectively performed in accordance with video characteristics of the input frame 510, such as prediction modes respective to the plurality of macroblocks 580 included in the input frame 510, or may not be performed.

Although not shown in additional drawings, an encryption process may be even performed with grouped frames by grouping a plurality of frames, which is included in the bit stream 570 of a compressed video, into two or more frames and by extracting the input frame in sequence from the grouped frames (if the encryption process is performed in a compression process, the encryption system for compressed video may group a plurality of frames, which is obtained from a video which is to be compressed, into two or more frames, into two or more frames, instead of grouping a plurality of frames, which is included in the bit stream 570 of a compressed video, into two or more frames).

Additionally, after performing the aforementioned encryption process, an encryption system for compressed video may further perform entropy encrypting for the input frame 590, which is encrypted, for compatibility with a standard.

Figure 6:
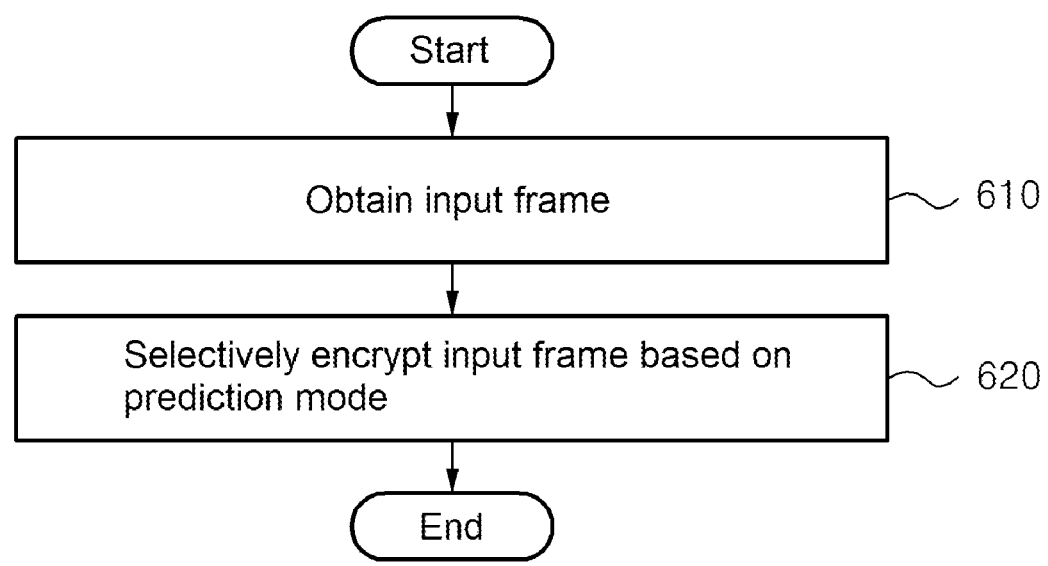
FIG. 6 is a flow chart showing an encryption method for compressed video according to an embodiment of the present disclosure.

FIG. 6 is a flow chart showing an encryption method for compressed video according to an embodiment of the present disclosure.

Referring to FIG. 6, an encryption system for compressed video according to an embodiment of the present disclosure obtains an input frame from a video, which is to be compressed, or from a compressed video which is partly decompressed (610).

Hereat, a step of obtaining an input frame from a compressed video which is partly decompressed may mean a step of parsing an input frame which is extracted from a bit stream of a compressed video which is partly decompressed.

During this, the encryption system for compressed video may perform an encryption process for each of a plurality of frames included in a video, which is to be compressed or in a compressed video which is partly decompressed, by extracting the input frame in sequence from the plurality of frames included in the video, which is to be compressed or in the compressed video which is partly decompressed.

Additionally, an encryption system for compressed video may even perform an encryption process with groups of a plurality of grouped frames, which is included in a compressed video which is to be compressed or in a compressed video which is partly decompressed, by grouping the plurality of frames, which is included in the compressed video which is to be compressed or in the compressed video which is partly decompressed, into two or more frames and by extracting the input frame in sequence from the grouped frames.

Subsequently, the encryption system for compressed video selectively encrypts an input frame based on prediction modes respective to a plurality of macroblocks included in the input frame (620). A detailed description about this will be stated in conjunction with FIG. 7.

Figure 7:
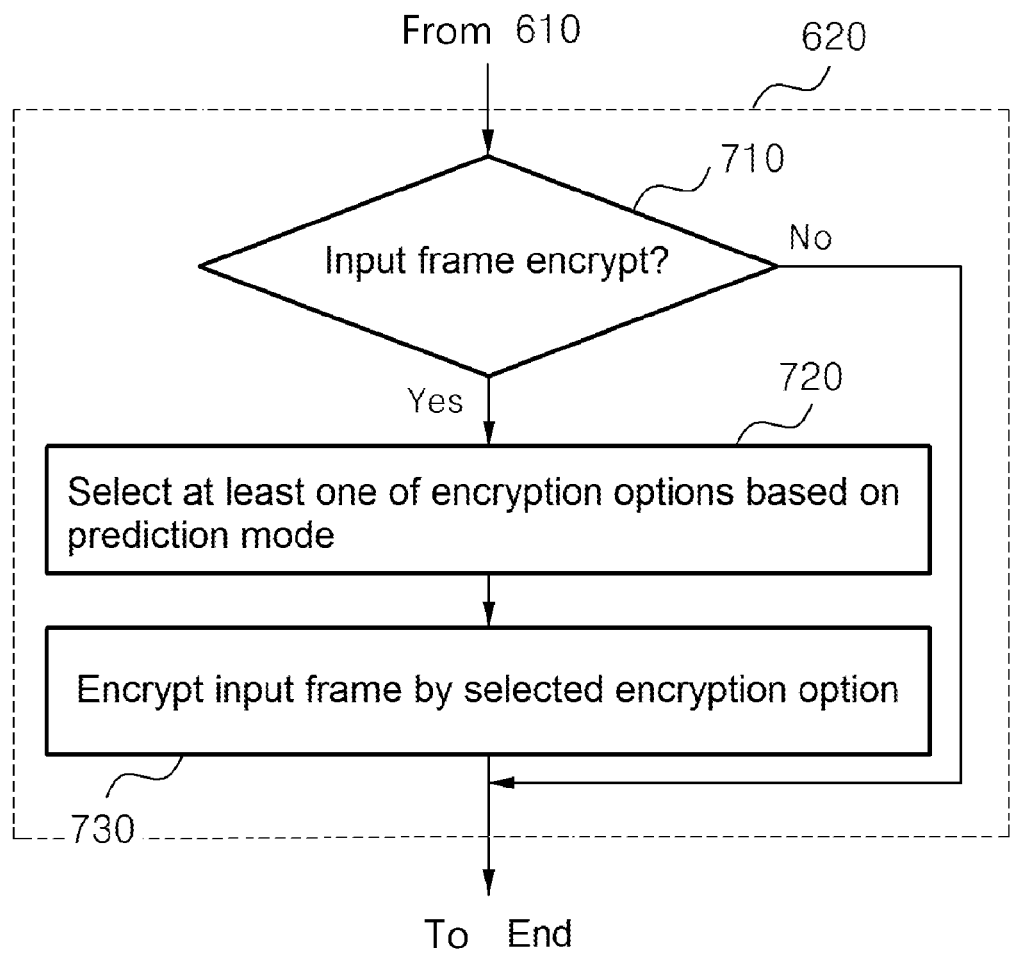
FIG. 7 is a flow chart showing steps of selectively encrypting an input frame shown in FIG. 6.

FIG. 7 is a flow chart showing steps of selectively encrypting an input frame shown in FIG. 6.

Referring to FIG. 7, an encryption system for compressed video according to an embodiment of the present disclosure may determine to encrypt an input frame based on prediction modes respective to the plurality of macroblocks (710).

After the determination, the encryption system for compressed video may select at least one of encryption options including macroblock order change, DCT coefficient sign change, and motion vector difference code change, based on prediction modes respective to the plurality of macroblocks (720).

After then, the encryption system for compressed video may encrypt the input frame in accordance with a selected encryption option (730).

In detail, for the case of selecting the encryption option of macroblock order change, the encryption system for compressed video may encrypt the input frame by changing an order of the plurality of macroblocks through a random shuffling map generated from a preliminarily established encryption key.

Otherwise, for the case of selecting the encryption option of DCT coefficient sign change, the encryption system for compressed video may encrypt an input frame by changing signs of DCT coefficients, which are included respectively in the plurality of macroblocks, through a random bitmask generated from a preliminarily established encryption key. For example, the encryption system for compressed video may change signs of DCT coefficients in application with a logical operation between a component of the random bitmask and sign bits of the DCT coefficients included respectively in the plurality of macroblocks.

Additionally, for the case of selecting the encryption option of motion vector difference code change, the encryption system for compressed video may encrypt an input frame by changing at least a part of motion vector difference codes respective to the plurality of macroblocks through a random bitmask generated from a preliminarily established encryption key. For example, the encryption system for compressed video may change at least a part of motion vector difference codes in application with a logical operation between a component of the random bitmask and information codes included in the motion vector difference codes respective to the plurality of macroblocks.

During this, although not sown in the drawing, after performing the aforementioned encryption process, an encryption system for compressed video may even perform entropy encrypting for the input frame, which is encrypted, for compatibility with a standard.

As such, an encryption method for compressed video according to an embodiment of the present disclosure may reduce an amount of encrypted video, and a time and cost for an encryption process by determining to encrypt an input frame among a plurality of frames which is included in a video which is to be compressed or in a compressed video which is partly decompressed, based on prediction modes respective to a plurality of macroblocks included in the input frame, and by selectively encrypting the input frame in accordance with a result of the determination.

Additionally, an encryption method for compressed video according to an embodiment of the present disclosure may condition an encrypted video for hard recognition in vision and for difficult inverse estimation of an encryption key by a hacker, while maintaining a standard compression format, and may reduce a delay time when decrypting the encrypted video, by selectively using at least one of encryption options including macroblock order change, DCT coefficient sign change, and vector difference code change.

Figure 8:
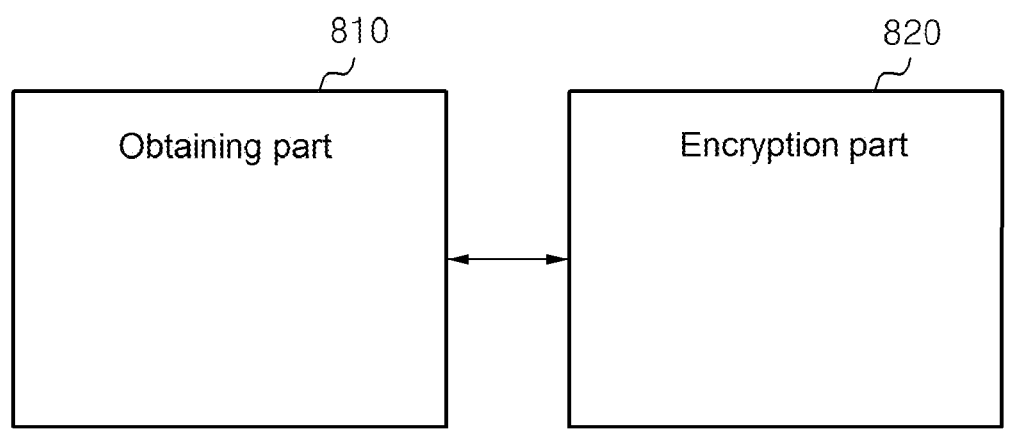
FIG. 8 is a block diagram illustrating an encryption system for compressed video according an embodiment of the present disclosure.

FIG. 8 is a block diagram illustrating an encryption system for compressed video according an embodiment of the present disclosure.

Referring to FIG. 8, an encryption system for compressed video according an embodiment of the present disclosure may include an obtaining part 810 and an encryption part 820.

The obtaining part 810 obtains an input frame which is extracted from a video, which is to be compressed, or a compressed video which is partly decompressed.

Hereat, a step of obtaining an input frame from a compressed video which is partly decompressed may mean a step of parsing an input frame which is extracted from a bit stream of a compressed video which is partly decompressed.

During this, the obtaining part 810 may perform an encryption process for each of a plurality of frames included in a video, which is to be compressed in the encryption part 820 or in a compressed video which is partly decompressed, by extracting the input frame in sequence from the plurality of frames included in the video, which is to be compressed or in the compressed video which is partly decompressed.

Additionally, the obtaining part 810 may even perform an encryption process with groups of a plurality of grouped frames, which is included in a compressed video which is to be compressed in the encryption part 820 or in a compressed video which is partly decompressed, by grouping the plurality of frames, which is included in the compressed video which is to be compressed or in the compressed video which is partly decompressed, into two or more frames and by extracting the input frame in sequence from the grouped frames.

The encryption part 820 selectively encrypts an input frame based on prediction modes respective to a plurality of macroblocks included in the input frame.

In detail, the encryption part 820 may determine to encrypt an input frame based on prediction modes respective to the plurality of macroblocks, and in the case of encrypting the input frame after the determination, the encryption part 820 may select at least one of encryption options including macroblock order change, DCT coefficient sign change, and motion vector difference code change, based on prediction modes respective to the plurality of macroblocks and may encrypt the input frame in accordance with a selected encryption option.

As an example, for the case of selecting the encryption option of macroblock order change, the encryption part 820 may encrypt the input frame by changing an order of the plurality of macroblocks through a random shuffling map generated from a preliminarily established encryption key.

Otherwise, for the case of selecting the encryption option of DCT coefficient sign change, the encryption part 820 may encrypt an input frame by changing signs of DCT coefficients, which are included respectively in the plurality of macroblocks, through a random bitmask generated from a preliminarily established encryption key. During this, the encryption part 820 may change signs of DCT coefficients in application with a logical operation between a component of the random bitmask and sign bits of the DCT coefficients included respectively in the plurality of macroblocks.

As still another example, for the case of selecting the encryption option of motion vector difference code change, the encryption part 820 may encrypt an input frame by changing at least a part of motion vector difference codes respective to the plurality of macroblocks through a random bitmask generated from a preliminarily established encryption key. During this, the encryption part may change at least a part of motion vector difference codes in application with a logical operation between a component of the random bitmask and information codes included in the motion vector difference codes respective to the plurality of macroblocks.

During this, the encryption system for compressed video may further include an encrypting performing part (not shown in the drawing) to perform entropy encrypting for the input frame, which is encrypted, for compatibility with a standard after performing the aforementioned encryption process.

As such, an encryption method for compressed video according to an embodiment of the present disclosure may reduce an amount of encrypted video, and a time and cost for an encryption process by determining to encrypt an input frame among a plurality of frames which is included in a video which is to be compressed or in a compressed video which is partly decompressed, based on prediction modes respective to a plurality of macroblocks included in the input frame, and by selectively encrypting the input frame in accordance with a result of the determination.

Additionally, an encryption method for compressed video according to an embodiment of the present disclosure may condition an encrypted video for hard recognition in vision and for difficult inverse estimation of an encryption key by a hacker, while maintaining a standard compression format, and may reduce a delay time when decrypting the encrypted video, by selectively using at least one of encryption options including macroblock order change, DCT coefficient sign change, and vector difference code change.

Figure 9:
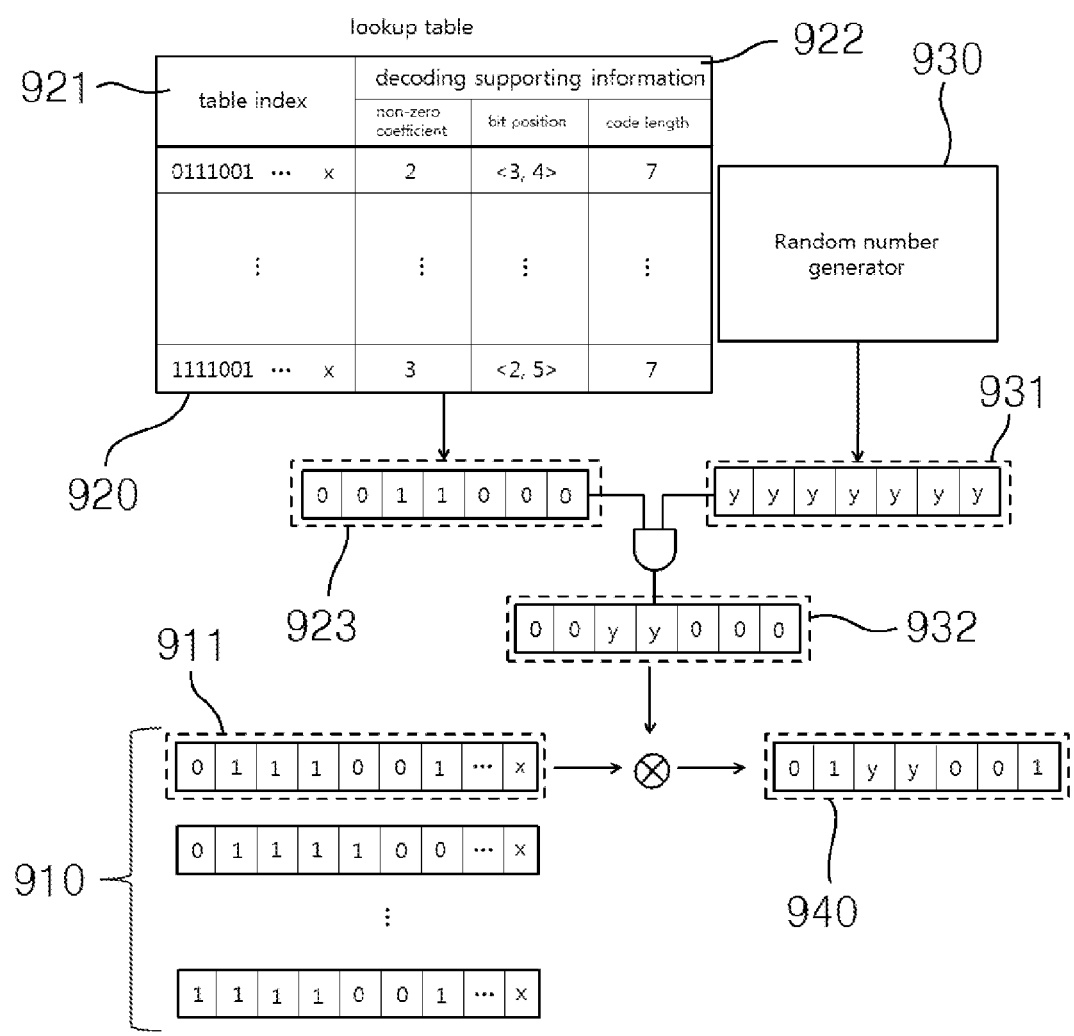
FIG. 9 is a schematic diagram illustrating a process of encrypting fast a part of bit streams included in a compressed video, without decryption, according to an embodiment of the present disclosure.

FIG. 9 is a schematic diagram illustrating a process of encrypting fast a part of bit streams included in a compressed video, without decryption, according to an embodiment of the present disclosure.

Referring to FIG. 9, an encryption system for compressed video according to an embodiment of the present disclosure may perform fast encryption with a part of bit streams, which are included in a compressed video, without decryption.

In detail, an encryption system for compressed video may encrypt a partial bit stream 911 by selectively using a lookup table 920 for the partial bit stream 911 among a plurality of bit streams 910 of a compressed video.

Hereat, the lookup table 920 may store and retain encryption information 922, which is necessary for each encryption of the plurality of bit streams, at addresses which are made from patterns respective to the plurality of bit streams. The patterns 921 respective to the plurality of bit streams mean patterns on bits formed by repetition of binary values (0 or 1). The x bit shown in the drawing means a bit optionally including one of the binary values 0 or 1. Hereinafter, a plurality of bit streams mentioned relevant to information which is stored and retained in the lookup table 920 indicates a plurality of bit streams included in various compressed videos including or excluding the plurality of bit streams 910 of the compressed video noted above.

The encryption information 922 necessary for encryption of each of the plurality of bit streams may include information about prediction modes of macroblocks corresponding respectively to the plurality of bit streams, information relevant to bits which are included in each of the plurality of bit streams and are to be encrypted, and information for code lengths respective to the plurality of bit streams. For example, the encryption information 922 may include information relevant to valid DCT coefficients of macroblocks corresponding respectively to the plurality of bit streams (e.g., information about the number of valid DCT coefficients (not-zero coefficients included in their corresponding macroblock), information relevant to bits which are included in each of the plurality of bit streams and are to be encrypted (e.g., information about a rank of a bit to be encrypted in each of the plurality of bit streams), and information for code lengths respective to the plurality of bit streams.

During this, the lookup table 920 may store the pattern 921 for each of the plurality of bit streams, and the encryption information 922 necessary for each encryption of the plurality of bit streams, those of which are settled therein to correspond in the ratio N:1.

The lookup table 920 like this may be preliminarily built, before a fast encryption process, without decryption, for the partial bit stream 911, and thereby may be used in the fast encryption process.

Additionally, the lookup table 920 may be updated in accordance with a result of decrypting the partial bit stream 911 by one bit based on a standard decryption mode described later, as well as being built before fast encryption without decryption for the partial bit stream 911. Detailed description about this will be stated in conjunction with FIG. 10.

Additionally, the pattern 921 for each of the plurality of bit streams and the encryption information 922 necessary for each encryption of the plurality of bit streams, which are stored and retained in the lookup table 920, may be adaptively set in capacity (number). For example, the lookup table 920 may be preliminarily built based on frequencies, which appears in a plurality of compressed videos, of the pattern 921 respective to the plurality of bit streams, and thereby may have a pertinent capacity but a too large capacity.

Summarily, the lookup table 920 may be built to include or exclude a pattern with a specific bit stream, based on whether the pattern with the specific bit stream appears with many frequencies or with relatively small frequencies in a compressed video.

Accordingly, an encryption system for compressed video may confirm whether a pattern of the partial bit stream 911 matches with one of the patterns 911 belonging to each of the plurality of bit streams stored in the lookup table 920, and after the confirmation, if the pattern of the partial bit stream 911 matches with one of the patterns 911 belonging to each of the plurality of bit streams, may encrypt the partial bit stream 911 by using the encryption information 920 stored in the lookup table 920.

For instance, in the case of that a pattern of the partial bit stream 911 matches with one of the patterns 911 belonging to each of the plurality of bit streams stored in the lookup table 920, an encryption system for compressed video may extract encryption information, which has an address of one pattern matching with the lookup table 920. Hereupon, an encryption system for compressed video may encrypt the partial bit stream 911 in application with DCT coefficient code change based on encryption information.

For more detailed example, in the case that the partial bit stream 911 has pattern '0111001' as shown in the drawing and encryption information stored at address '0111001' in the lookup table 920 is '(2. <3.4>, 7)', an encryption system for compressed video may extract a bitmask 923 of '0011000' from the lookup table 920 (hereat, the bitmask 923 of '0011000' is generated by allocating 1 of binary values to third and fourth bits which are positions of bits to be encrypted in the partial bit stream 911 and by allocating 0 of binary values to the rest bit positions). Hereupon, the encryption system for compressed video may perform an AND operation between a random number 931, which is output from a random number generator 930, and the bitmask 931 of '0011000' extracted from the lookup table 920 and thereafter may perform an XOR operation between an AND-operated value 932 and the partial bit stream 911 to output an encrypted result 940.

As described above, if encryption for the partial bit stream 911 is completed, an encryption system for compressed video may perform encryption for the next bit stream subsequent to the partial bit stream 911 in the same manner and thereby may perform encryption through the lookup table 920 for the entire frame of a compressed video.

Hereat, an encryption system for compressed video may apply DCT coefficient sign change to an encryption process using the lookup table 920, by including information, which is needed for another encryption technique in addition to the encryption technique of DCT coefficient sign change, and may even also apply other various encryption techniques thereto.

For example, in the case that a pattern of the partial bit stream 911 matches with one of the patterns 921 belonging to each of the plurality bit streams stored in the lookup table 920, an encryption system for compressed video may extract encryption information which has an address of the one pattern matching with the lookup table 920. Hereupon, the encryption system for compressed video, after obtaining an input frame including the partial bit stream 911, may select at least one of encryption options including macroblock order change, DCT coefficient sign change, and motion vector difference code change, based on each prediction mode (each prediction mode of the plurality of macroblocks is obtained by collecting information about prediction modes of macroblocks corresponding respectively to the plurality of bit streams included in the extracted encryption information) of the plurality of macroblocks included in the input frame which is confirmed from the encryption information extracted as aforementioned. Accordingly, an encryption system for compressed video may encrypt an input frame in accordance with a selected encryption option. In this case, the encryption system for compressed video may perform the encryption process, which is described in conjunction with FIGS. 2 to 8, in the same manner.

From the confirmation, unless a pattern of the partial bit stream 911 matches with one of the patterns belonging to each of the plurality of bit streams stored in the lookup table 920, an encryption system for compressed video may decrypt the partial bit stream 911 based on a standard decryption mode and may encrypt the partial bit stream 911 based on a result of the decryption.

For example, an encryption system for compressed video may select at least one of encryption options including macroblock order change, DCT coefficient sign change, and motion vector difference code change, based on prediction modes respective to the plurality of macroblocks included in an input frame which is confirmed from a decrypted result based on a standard decryption mode as aforementioned, after obtaining the input frame including the partial bit stream 911. Accordingly, an encryption system for compressed video may encrypt an input frame in accordance with a selected encryption option. As also, an encryption system for compressed video may perform the encryption process, which is described in conjunction with FIGS. 2 to 8, in the same manner.

As such, an encryption system for compressed video may dually apply an encryption technique thereto by selectively using the lookup table 920. Hereat, selectively using the lookup table 920 means to selectively use information stored in the lookup table 920 in purpose of performing encryption according to "whether a pattern of the partial bit stream matches with one of the patterns belonging to each of the plurality of bit streams stored in the lookup table 920".

Figure 10:
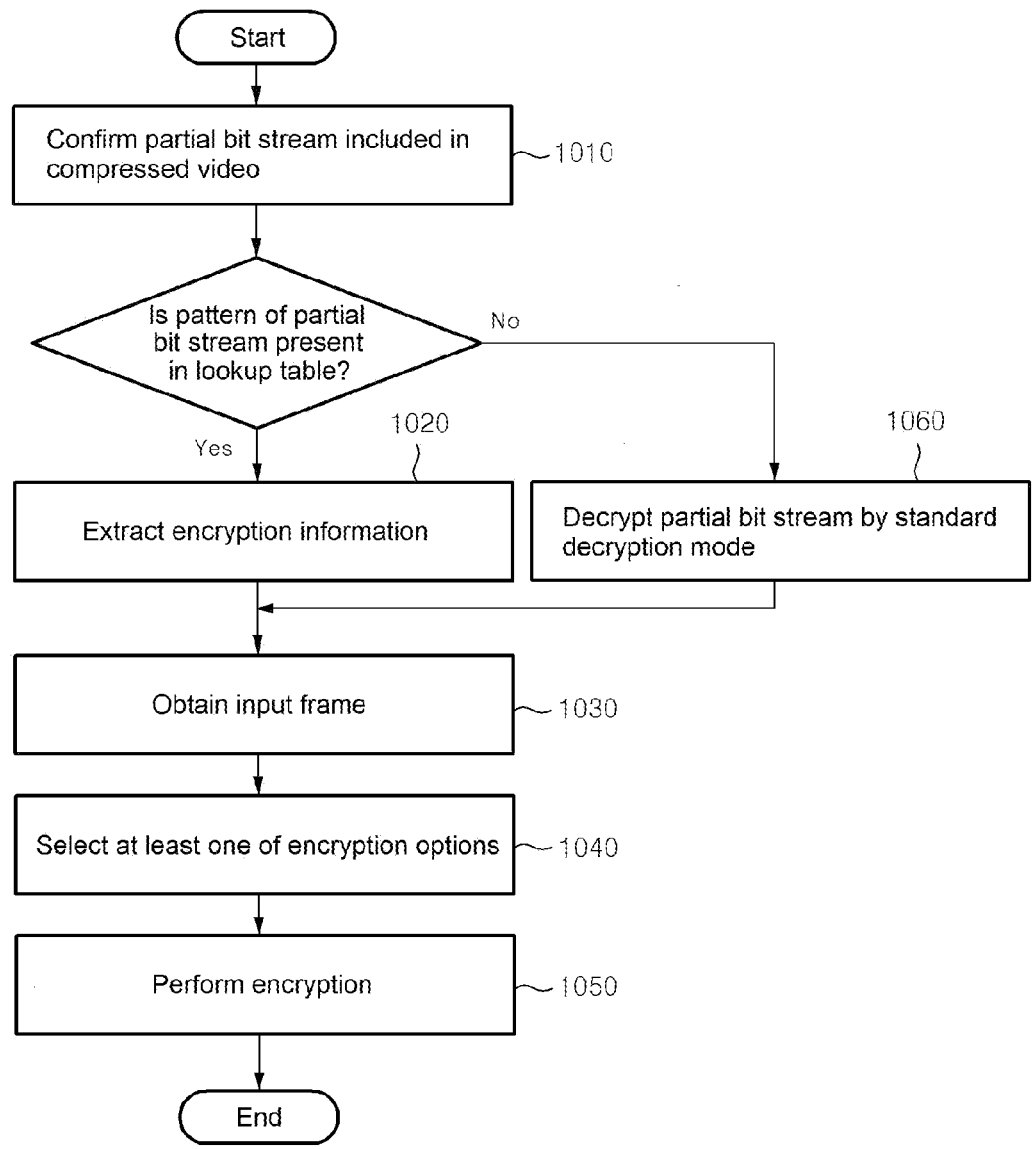
FIG. 10 is a flow chart showing an encryption method for compressed video according to another embodiment of the present disclosure.

FIG. 10 is a flow chart showing an encryption method for compressed video according to another embodiment of the present disclosure.

Referring to FIG. 10, an encryption system for compressed video according to another embodiment of the present disclosure confirms a partial bit stream which is included in a compressed video (1010).

For example, an encryption system for compressed video may confirm whether a pattern of the partial bit stream matches with one of patterns belonging to each of a plurality of bit streams stored in a lookup table.

Hereat, the lookup table stores encryption information, which is needed for each encryption of the plurality of bit streams, at addresses of patterns respective to the plurality of bit streams.

Additionally, although not shown in the drawing, the lookup table may be preliminarily built before the step 1010. For example, an encryption system for compressed video may preliminarily build a lookup table based on frequencies, which appear in a plurality of compressed videos including a compressed video, of patterns respective to the plurality bit streams.

After then, the encryption system for compressed video selectively uses the lookup table, based on a result of the confirmation, to encrypt the partial bit stream.

In detail, in the case that a pattern of the partial bit stream matches with one of the patterns belonging to each of the plurality of bit streams stored in the lookup table, the encryption system for compressed video may extract encryption information which has an address of one pattern (1020).

During this, although not shown in the drawing, the encryption system for compressed video, if encryption information is extracted for the partial bit stream, may encryption information for the next bit stream, which is subsequent to the partial bit stream, through the steps 1010 and 1020.

Next, the encryption system for compressed video may obtain an input frame including the partial bit stream (1030). For example, an encryption system for compressed video may obtain an input frame as the unit of frame by confirming the next bit stream and the next bit stream but one which are subsequent to the partial bit stream. In this case, encryption information extracted through the step 1020 for the next bit stream and the next bit stream but one may be merged for a step of selecting an encryption option described later or for a step of performing encryption.

Next, the encryption system for compressed video may select at least one of encryption options including macroblock order change, DCT coefficient sign change, and motion vector difference code change, based on prediction modes respective to the plurality of macroblocks included in the input frame which is confirmed from the extracted encryption information (1040).

After then, the encryption system for compressed video may encrypt the input frame in accordance with the selected encryption option (1050).

Hereat, the steps 1040 and 1050 may be performed in the same manner with the step of performing encryption for an input frame in accordance with an encryption option as described in conjunction with FIG. 7.

Contrarily, in the case that a pattern of the partial bit stream does not match with one of patterns belonging to each of the plurality of bit streams stored in the lookup table, the encryption system for compressed video may decrypt the partial bit stream based on a standard decryption mode (1060).

During this, the encryption system for compressed video may even update the lookup table in accordance with a result of decryption of the partial bit stream based on a standard decryption mode. For example, an encryption system for compressed video may update the lookup table by storing encryption information, which is obtained from a result of decryption of the partial bit stream, at an address of a pattern of the partial bit stream. If the lookup table is preliminarily completed and built, the updating step may be omitted.

Accordingly, the encryption system for compressed video, after processing the step 1030 for obtaining an input frame including the partial bit stream, may select at least one of encryption options including macroblock order change, DCT coefficient sign change, and motion vector difference code change, based on prediction modes respective to the plurality of macroblocks included in the input frame which is confirmed from a result of the decryption of the step 1060. After then, the encryption system for compressed video may encrypt the input frame in accordance with the selected encryption option as same as the step 1050.

Figure 11:
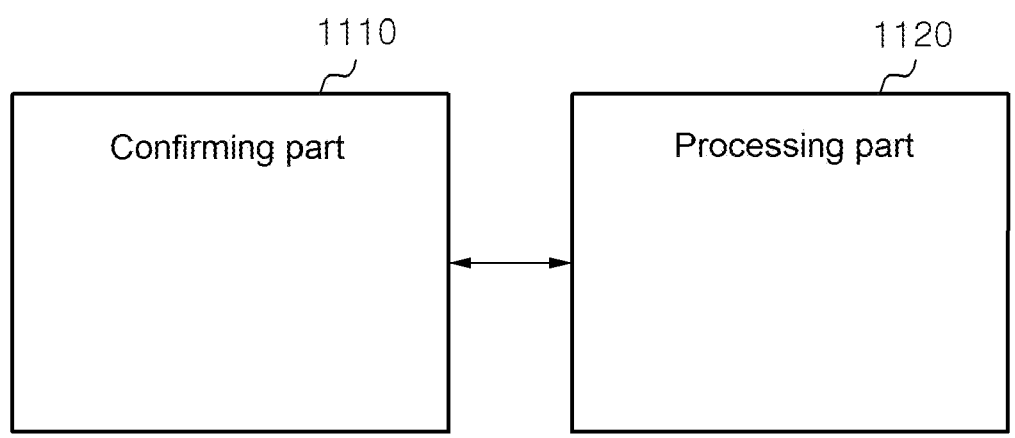
FIG. 11 is a block diagram illustrating an encryption system for compressed video according to another embodiment of the present disclosure.

FIG. 11 is a block diagram illustrating an encryption system for compressed video according to another embodiment of the present disclosure.

Referring to FIG. 11, an encryption system for compressed video according to another embodiment of the present disclosure may include a confirming part 1110 and a processing part 1120.

The confirming part 1110 confirms a partial bit stream which is included in a compressed video.

For example, the confirming part 1110 may confirm whether a pattern of the partial bit stream matches with one of patterns respective to a plurality of bit streams included in a lookup table.

Hereat, the lookup table stores encryption information, which is needed for each encryption of the plurality of bit streams, at addresses of patterns respective to the plurality of bit streams.

Additionally, although not shown in the drawing, an encryption system for compressed video may further include a lookup table building part for preliminarily building a lookup table before performing a confirming operation by the confirming part 1110. For example, the lookup table building part may preliminarily build a lookup table based on frequencies, which appear in a plurality of compressed videos including compressed videos, of patterns respective to the plurality of bit streams.

The processing part 1120 selectively uses a lookup table, based on a result of confirmation, and processes a partial bit stream. Hereat, the processing may include encryption, search, decryption, and so on.

In detail, for the case that a pattern of the partial bit stream matches with one of patterns respective to the plurality of bit streams included in the lookup table, the processing part 1120 may extract encryption information which has an address of one of patterns, and may encrypt the partial bit stream based on the extracted encryption information.

Hereat, the processing part 1120, if encryption information is extracted for the partial bit stream, may extract encryption information even for the next bit stream subsequent to the partial bit stream.

During this, since the encryption information may include information about prediction modes of macroblocks corresponding respectively to the plurality of bit streams, information relevant to bits which are included in each of the plurality of bit streams and are to be encrypted, and information for code lengths respective to the plurality of bit streams, the processing part 1120, after obtaining an input frame including the partial bit stream (an input frame as the unit of frame is obtained by confirming the next bit stream and the next bit stream but one which are subsequent to the partial bit stream), may select at least one of encryption options including macroblock order change, DCT coefficient sign change, and motion vector difference code change, based on prediction modes respective to the plurality of macroblocks included in the input frame confirmed from the extracted encryption information.

Hereat, an operation of the processing part 1120 for encrypting an input frame in accordance with a selected encryption option may be the operation of the encryption part for performing an input frame in accordance with encryption options described in conjunction with FIG. 8.

Contrarily, in the case that a pattern of the partial bit stream does not match with one of patterns belonging to each of the plurality of bit streams stored in the lookup table, the processing part 1120 may decrypt the partial bit stream based on a standard decryption mode and may encrypt the partial bit stream based on a result of decryption.

During this, the processing part 1120 may even update the lookup table in accordance with a result of decryption of the partial bit stream, based on a standard decryption mode, by cooperating with a lookup table building part.

Accordingly, the processing part 1120, after obtaining an input frame including the partial bit stream, may select at least one of encryption options including macroblock order change, DCT coefficient sign change, and motion vector difference code change, based on prediction modes respective to the plurality of macroblocks included in the input frame which is confirmed from a result of decryption.

While embodiments of the present disclosure have been shown and described with reference to the accompanying drawings thereof, it will be understood by those skilled in the art that various changes and modifications in form and details may be made therein without departing from the spirit and scope of the present disclosure as defined by the appended claims and their equivalents. For example, it may be allowable to achieve desired results although the embodiments of the present disclosure are performed in other sequences different from the descriptions, and/or the elements, such as system, structure, device, circuit, and so on, are combined or assembled in other ways different from the descriptions, replaced or substituted with other elements or their equivalents.

Therefore, other implementations, other embodiments, and equivalents of the appended claims may be included in the scope of the appended claims.

What is claimed is:

1. An encryption method for compressed video, the method comprising:
   confirming a partial bit stream included in a compressed video; and
   selectively using a lookup table, the lookup table storing encryption information, which is needed for each encryption of a plurality of bit streams, at addresses of patterns respective to the plurality of bit streams based on a result of the confirmation and encrypting the partial bit stream,
   wherein the encrypting of the partial bit stream comprises:
   if a pattern of the partial bit stream matches with one of patterns respective to the plurality of bit streams stored in the lookup table, extracting encryption information at an address of the one pattern; and
   encrypting the partial bit stream based on the extracted encryption information.

2. The method of claim 1, wherein the encryption information comprises information about prediction modes of macroblocks respective to the plurality of bit streams, information relevant to bits that are included respectively in the plurality of bit streams and are to be encrypted, and information for code lengths respective to the plurality of bit streams,
   wherein the encrypting of the partial bit stream comprises:
   obtaining an input frame including the extracted encryption information;
   selecting at least one of encryption options including macroblock order change, DCT Discrete Cosine Transform) coefficient sign change, and motion vectors difference code change, based on predictions modes respective to a plurality of macroblocks included in the input frame that is confirmed from the extracted encryption information; and
   encrypting the input frame in accordance with the selected encryption option.

3. The method of claim 1, wherein the encrypting of the partial bit stream comprises:
   unless a pattern of the partial bit stream matches with one of patterns respective to the plurality of bit streams stored in the lookup table, decrypting the partial bit stream based on a standard decryption mode; and
   encrypting the partial bit stream based on a result of the decryption.

4. The method of claim 3, wherein the encrypting of the partial bit stream comprises:
   obtaining an input frame including the partial bit stream;
   selecting at least one of encryption options including macroblock order change, DCT (Discrete Cosine Transform) coefficient sign change, and motion vector difference code change, based on predictions modes respective to a plurality of macroblocks included in the input frame that is confirmed from the extracted encryption information; and
   encrypting the input frame in accordance with the selected encryption option.

5. The method of claim 1, further comprising:
   preliminarily building based on frequencies, which appear in a plurality of compressed videos including the compressed video, of patterns respective to the plurality of bit streams.

6. The method of claim 1, wherein the confirming of the partial bit stream included in the compressed video comprises:
   confirming whether a pattern of the partial bit stream matches with one of patterns respective to the plurality of bit streams stored in the lookup table.

7. An encryption method for compressed video, the method comprising:
   obtaining an input frame from a compressed video that is to be compressed or from a compressed video that is partly decompressed; and
   selectively encrypting the input frame based on prediction modes respective to a plurality of macroblocks included in the input frame, wherein the selectively encrypting of the input frame comprises:
   determining to encrypt the input frame based on prediction modes respective to the plurality of macroblocks;
   if the determination results in that the input frame is to be encrypted, selecting at least one of encryption options including macroblock order change, DCT (Discrete Cosine Transform) coefficient sign change, and motion vector difference code change, based on predictions modes respective to a plurality of macroblocks, and
   encrypting the input frame in accordance with the selected encryption option.

8. The method of claim 7, wherein the obtaining of the input frame comprises:
   sequentially extracting the input frame from a plurality of frames included in the video that is to be compressed or the compressed video that is partly decompressed.

9. The method of claim 7, wherein the obtaining of the input frame comprises:
   grouping a plurality of frames, which is included in the video that is to be compressed or the compressed video that is partly decompressed, into two or more frames and sequentially extracting the input frame.

* * * * *